J. E. CASEY.
Churn.

No. 53,521.

Patented March 27, 1866.

Witnesses:

Inventor:
James E. Casey.

UNITED STATES PATENT OFFICE.

JAMES E. CASEY, OF CORTLAND VILLAGE, NEW YORK, ASSIGNOR TO HIMSELF AND RICHD. LAMBERT, OF SAME PLACE.

IMPROVEMENT IN CHURNS.

Specification forming part of Letters Patent No. 53,521, dated March 27, 1866.

*To all whom it may concern:*

Be it known that I, JAMES E. CASEY, of Cortland Village, Cortland county, and State of New York, have invented a new and useful Improvement in Churns; and I do hereby declare that the following is a full, clear, and exact description of the same, reference being had to the annexed drawings, made part of this specification, in which—

Figure 1:
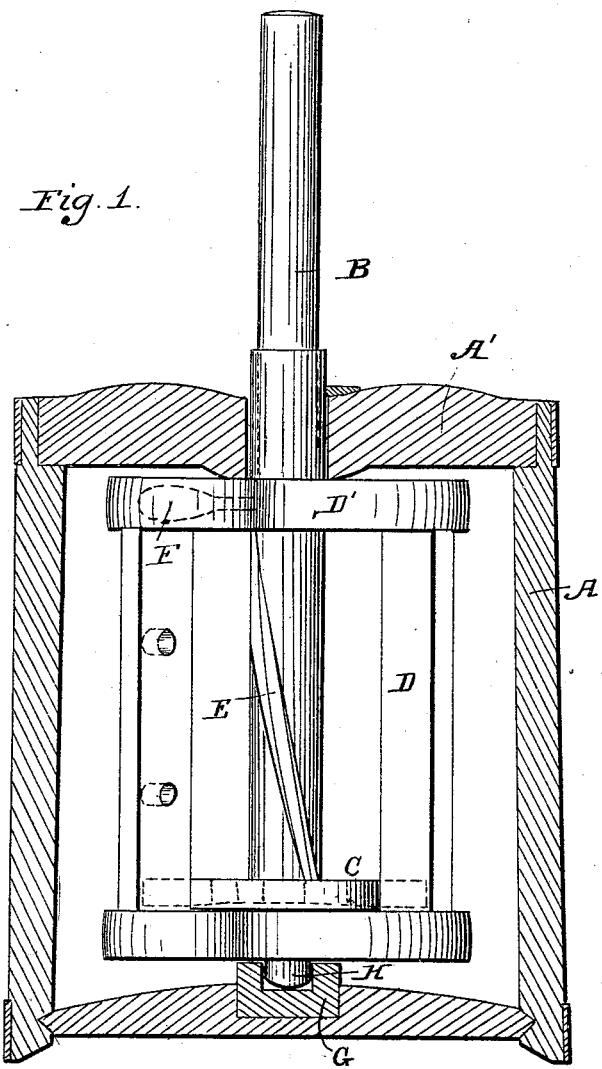
Figure 2:
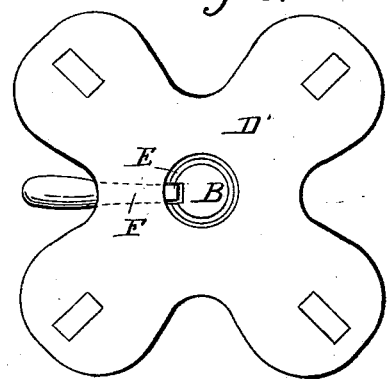

Figure 1 is a vertical section, and Fig. 2 is a top view of the reciprocating supplementary dasher.

The same letters in the different figures refer to identical parts.

A is the barrel of the common vertical churn, having a cover, A', through a round hole in the top of which works the handle of the dasher B, having on its lower end the ordinary dasher C. A spiral-grooved guide, E, in the dasher-handle B receives the point of a set-screw, F, which passes through the cross top piece, D', of the reciprocating supplementary dasher D, which point fits neatly, but not tightly, into the groove. The supplementary dasher has two head-pieces, which I make in the form of a Greek cross, and between their opposite arms are pieces let into these arms and having their greatest diameter radially to the barrel of the churn, as shown. At the center of the lower cross-formed head is a pivot, H, revolving freely on a step, G.

The supplementary dasher plays freely within the barrel of the churn.

When the handle of the dasher is seized firmly and worked up and down, as in the ordinary churn, the top being securely fastened to the churn by means of the spiral-grooved guide E and the pin F, a rotary reciprocating motion is given to the supplementary dasher D, and the fluid to be churned is violently agitated by this in addition to the ordinary dasher C.

The forms of these dashers may be varied, and such openings as may be thought necessary may be made through them without altering the essential principles of my churn. So, too, equivalent means may be adopted for creating a reciprocating rotary motion.

What I claim as my invention, and seek to secure by Letters Patent, is—

A device for communicating a reciprocating rotary motion to a supplementary dasher of a churn, substantially in the manner and for the purpose set forth.

In testimony whereof I have signed my name to this specification in the presence of two subscribing witnesses.

JAMES E. CASEY.

Witnesses:
R. MASON,
L. MURPHY.